United States Patent
Mckenzie et al.

(10) Patent No.: US 11,521,408 B2
(45) Date of Patent: Dec. 6, 2022

(54) SYSTEMS AND METHODS FOR DYNAMIC DIGITIZATION AND EXTRACTION OF AVIATION-RELATED DATA

(71) Applicant: AERO RECORD TECHNOLOGIES INC., Toronto (CA)

(72) Inventors: Burke Mckenzie, Toronto (CA); Tyler Davidson, Colomban (CA); Henry Tang, St. Catharines (CA); Cody St. Hilaire, Boulogne Billancourt (FR)

(73) Assignee: AERO RECORD TECHNOLOGIES INC., Toronto (CA)

( * ) Notice: Subject to any disclaimer, the term of this patent is extended or adjusted under 35 U.S.C. 154(b) by 0 days.

(21) Appl. No.: 17/451,461

(22) Filed: Oct. 19, 2021

(65) Prior Publication Data
US 2022/0121845 A1    Apr. 21, 2022

Related U.S. Application Data

(60) Provisional application No. 63/094,124, filed on Oct. 20, 2020, provisional application No. 63/114,822, filed on Nov. 17, 2020.

(51) Int. Cl.
*G06V 30/416* (2022.01)
*H04N 1/00* (2006.01)
(Continued)

(52) U.S. Cl.
CPC ....... *G06V 30/416* (2022.01); *H04N 1/00005* (2013.01); *H04N 1/00037* (2013.01);
(Continued)

(58) Field of Classification Search
CPC ...... G06V 30/10; G06V 30/416; G06V 10/28; G06V 30/162; G06V 10/768;
(Continued)

(56) References Cited

U.S. PATENT DOCUMENTS

5,590,271 A * 12/1996 Klinker .................. G06F 9/451
714/E11.181
6,633,332 B1 * 10/2003 Nay ....................... H04N 1/107
348/207.99
(Continued)

*Primary Examiner* — Negussie Worku
(74) *Attorney, Agent, or Firm* — Knobbe, Martens, Olson & Bear, LLP (57) ABSTRACT

Features for analyzing one or more images with image recognition to detect bounds to accurately convert physical text (e.g., pilot logbooks, aviation-related documents, journey logbooks, aircraft mechanics work orders, airframe logbooks, propeller logbooks, and engine logbooks) into digital format. Based on the predefined bounds, character recognition, e.g., OCR/ICR/ICR engine(s), may be used to convert each cell to a digital format. A decision engine determines, based on reinforcement learning data, the correct value of each cell based on a confidence of the character recognition. The decision engine may be a series of logical filtering, sorting, context rules (e.g., REGEX rules for specific columns) and suggestions based on the reinforcement learning model used to normalize the imperfections associated with the character recognition technologies. The final result is a serialized digital format that can be exported to an endpoint (e.g., spreadsheets, database, etc.).

20 Claims, 8 Drawing Sheets

(51) Int. Cl.
*H04N 1/04* (2006.01)
*G06V 30/10* (2022.01)

(52) U.S. Cl.
CPC ........... *H04N 1/00074* (2013.01); *H04N 1/04* (2013.01); *G06V 30/10* (2022.01)

(58) Field of Classification Search
CPC .............. G06V 30/422; G06V 30/413; H04N 1/00005; H04N 1/00037; H04N 1/00074; H04N 1/04; H04N 1/403; H04N 1/19505; H04N 1/19515; H04N 1/19568; H04N 13/332; H04N 2201/0436; H04N 5/76; H04N 5/77; H04N 9/8205; G06F 16/29; G06F 16/338; G06F 16/9537; G06F 16/954; G06F 3/0481; G06F 16/23; G06F 1/163; G06F 1/1686; G06F 16/20; G06F 16/243; G06F 16/24578; G06F 16/31; G06F 16/3344; G06F 16/35; G06F 16/353; G06F 16/951; G06F 3/011; G06F 3/013; G06F 3/0304; G06F 16/58; G06F 16/93; G06Q 10/10; G06Q 10/08355; G06Q 30/0185; G06T 2207/30176; G06T 3/40; G06T 3/4053; G06T 5/003; G06T 2207/10008; G06T 2207/20012; G06T 2207/20021; G06T 5/007; G06T 5/40; G06T 7/11; G06T 7/73; G09B 29/00; G09B 11/00; G09G 2320/0626; G09G 2320/066; G09G 2320/08; G09G 2380/08; G09G 5/00; H04L 67/30; G06N 20/00
USPC ......................................................... 358/474
See application file for complete search history.

(56) References Cited

U.S. PATENT DOCUMENTS

| | | | | |
|---|---|---|---|---|
| 6,901,377 | B1* | 5/2005 | Rosenfeld | G06Q 30/0625 705/26.62 |
| 8,081,849 | B2* | 12/2011 | King | G06V 30/142 382/307 |
| 8,521,342 | B2* | 8/2013 | Bamesberger | G06F 11/34 701/31.4 |
| 2001/0056443 | A1* | 12/2001 | Takayama | G01C 21/3644 715/244 |
| 2007/0039194 | A1* | 2/2007 | Dvir | B23B 51/101 30/169 |
| 2016/0253303 | A1* | 9/2016 | Pennington | G06V 30/40 715/226 |
| 2020/0051026 | A1* | 2/2020 | Uhland | G06Q 10/101 |

\* cited by examiner

| Year 2020 | | Aircraft | | Pilot in Command | Co-Pilot | Remarks | Single-Engine | | | |
|---|---|---|---|---|---|---|---|---|---|---|
| | | | | | | | Day | | Night | |
| Month | Day | Type | Registration | Name | Student or Passenger | Exercises, Flight No., Mission or Other... | Dual | Pilot in Command | Dual | Pilot in Command |
| 08 | 23 | DH8D 402 | CFSRN | Joe Brown | L. Murray | YYZ - YSJ - YYZ | | | | |
| 08 | 24 | DH8D 402 | CFSRN | S. Tebbutt | L. Murray | YYZ - YSJ - YYZ | | | | |
| 08 | 25 | DH8D 402 | CFSRN | Joe Brown | L. Murray | YYZ - YSJ - YYZ | | | | |
| 08 | 26 | DH8D 402 | CFSRN | Joe Brown | L. Murray | YCT - YQR | | | | |
| 08 | 27 | DH8D 402 | CFSRN | A. Lincoln | L. Murray | YYZ - YXV - YYZ | | | | |
| 09 | 01 | DH8D 402 | CFSRN | G. Washington | L. Murray | YCT - YQR | | | | |
| 09 | 02 | DH8D 402 | CFSRN | A. Sander | L. Murray | YQR - YCT | | | | |
| 09 | 04 | DH8D 402 | CFSRN | J. Bezos | L. Murray | YYZ - YSB | | | | |
| 09 | 05 | DH8D 402 | CFSRN | T. Cook | L. Murray | YCT - YQR | | | | |
| 09 | 06 | DH8D 402 | CFSRN | M. Anne | L. Murray | YYZ - YSJ - YYZ | | | | |
| | | | | | | Grand Total (Columns 1 to 10) 2638.5 Hours | Page Totals ▲ | | | |
| | | | | | | | Totals Forwarded ▲ | | | |
| Entries and Times Certified Correct. | | | | | | | ▼ Totals to Date ▲ | | | |
| Signature | | | | 09-06-2020 Date | | | 1 | 2 | 3 | 4 |

| Multi-Engine | | | | | Instrument | | | Take-Offs & Landings | Cross-Country | | | | Route of Flight | |
|---|---|---|---|---|---|---|---|---|---|---|---|---|---|---|
| Day | | Night | | | | | | | Day | | Night | | | |
| Dual | Pilot in Command | Co-Pilot | Dual | Pilot in Command | Co-Pilot | Actual IMC | Hood | FTD | IFR Appr. | Month/Month | Dual | PIC | Dual | PIC | From | To |
| 5 | 6 | 7 | 8 | 9 | 10 | | | | | | | | | | |
| | | 1.0 | | | 3.3 | 302a | | | | | | | | | YYZ | YSJ |
| | | 3.7 | | | 1.7 | | | | | | | | | | YYZ | YSJ |
| | | 1.3 | | | 3.7 | | | | | | | | | | YYZ | YSJ |
| | | | | | 2.6 | | | | | | | | | | YCT | YQR |
| | | 1.5 | | | | | | | | | | | | | YYZ | YRV |
| | | | | | 2.6 | | | | | | | | | | YCT | YQR |
| | | | | | 2.4 | | | | | | | | | | YQR | YCT |
| | | 1.2 | | | | | | | | | | | | | YYZ | YSB |
| | | | | | 2.4 | | | | | | | | | | YCT | YQR |
| | | 2.3 | | | 2.9 | | | | | | | | | | YYZ | YSJ |
| | | 11.0 | | | 21.6 | 302b | | | | | | | | | | |
| | | 2233.7 | | | 392.2 | | | | | | | | | | | |
| | | 2244.7 | | | 413.8 | | | | | | | | | | | |

| Month | Day | Aircraft Type | Aircraft Registration | Pilot in Command | Co-Pilot | Remarks | Single-Engine Day Dual | Single Engine Night Pilot in Command | Single Engine Night Dual | Single Engine Night Pilot in Command |
|---|---|---|---|---|---|---|---|---|---|---|
| | 8 | 23 DH8D 40Z | CFSRN | Joe BROWN | L. MURRAY | YYZ-YSJ-YYZ | | | | |
| | 8 | 24 DH8D 40Z | CFSRN | S. TEBBUTT | L. MURRAY | YYZ-YSJ-YYZ | | | | |
| | 8 | 25 DH8D 40Z | CFSRN | Joe Brown | L. MURRAY | YYZ-YSJ-YYZ | | | | |
| | 8 | 26 DH8D 40Z | CFSRN | Joe Brown | L. MURRAY | YCT-YQR | | | | |
| | 8 | 27 DH8D 40Z | CFSRN | A. LINCOLN | L. MURRAY | YYZ-YXV-YYZ | | | | |
| | 9 | 1 DH8D 40Z | CFSRN | G. WASHING | L. MURRAY | YCT-YQR | | | | |
| | 9 | 2 DH8D 40Z | CFSRN | A. SANDLER | L. MURRAY | YQR-YCT | | | | |
| | 9 | 4 DH8D 40Z | CFSRN | J. BEZOS | L. MURRAY | YYZ-YSB | | | | |
| | 9 | 5 DH8D 40Z | CFSRN | T. COOK | L. MURRAY | YCT-YQR | | | | |
| | 9 | 6 DH8D 40Z | CFSRN | M. ANNE | L. Murray | YYZ-YSJ-YYZ | | | | |

| Must-Engine Day Dual | Must-Engine Day PIC | Must-Engine Day Co-Pilot | Must-Engine Night Dual | Must-Engine Night PIC | Must-Engine Night Co-Pilot | Instr. Actual | Instr. Hood | Instr. FTD | Instr. IFR Appr | Take off & Landing Day | Take off & Landing Night | Cross-Country Day Dual | Cross-Country Day PIC | Cross-Country Night Dual | Cross-Country Night PIC | RGF From | RGF To |
|---|---|---|---|---|---|---|---|---|---|---|---|---|---|---|---|---|---|
| | | 1 | | | | 3.3 | | | | | | | | | | YYZ | YSJ |
| | 3.7 | | | | | 1.7 | | | | | | | | | | YYZ | YSJ |
| | | 1.3 | | | | 3.7 | | | | | | | | | | YYZ | YSJ |
| | 1.5 | | | | | 2.6 | | | | | | | | | | YCT | YQR |
| | | | | | | | | | | | | | | | | YYZ | YXV |
| | | | | | | 2.6 | | | | | | | | | | YCT | YQR |
| | 1.2 | | | | | 2.4 | | | | | | | | | | YQR | YCT |
| | | | | | | | | | | | | | | | | YYZ | YSB |
| | | | | | | 2.4 | | | | | | | | | | YCT | YQR |
| | 2.3 | | | | | 2.9 | | | | | | | | | | YYZ | YSJ |

SYSTEMS AND METHODS FOR DYNAMIC DIGITIZATION AND EXTRACTION OF AVIATION-RELATED DATA

BACKGROUND

Field

This disclosure relates to managing aviation-related data, in particular to analyzing images of aviation-related documents and pilot logbooks for the purpose of digitization.

Description of the Related Art

Aircraft operators, maintenance repair, overhaul ("MRO"s), and pilots are required to keep paper-based records in which all data concerning an aircraft and its flights are recorded. Because of the nature of having a physical copy of documentation, it is subject to physical inconveniences such as taking up physical space or being misplaced or illegible. Data entry clerks are employed to manually enter handwritten information from aviation-related documents into software that manages the maintenance and tracking of aircrafts. Because of the nature and nuances of individual human writing and human error when recording in physical formats, documents are subject to having incorrect data filled in. Further, inaccuracies in existing systems for scanning data and/or in analyzing images of aviation data may lead to error in the resulting records. Improvements to these and other drawbacks of scanning documents and other records and for digitizing aviation-related image data are desirable.

SUMMARY

The embodiments disclosed herein each have several aspects that no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for aviation data entry.

The following disclosure describes non-limiting examples of some embodiments. Other embodiments of the disclosed systems and methods may or may not include the features described herein. Moreover, disclosed advantages and benefits can apply only to certain embodiments of the invention and should not be used to limit the disclosure.

Aviation-related documents may be digitized to improve the efficiencies of record keeping requirements, some of which are required by law. Pilots may be legally required by the Federal Aviation Administration ("FAA") to keep a digital format of a logbook to keep compliant with the Pilot Record Database ("PRD"). For pilots who have a handwritten logbook, this may require the manual entry of past logbook entries into a digital logbook. The manual entry of past logbook entries may require a large amount of time. Further, scanning a large amount of data may be difficult to check for accuracy after the data is imported.

Features are described herein for analyzing one or more images with image recognition to detect bounds to accurately convert physical text (e.g., pilot logbooks, aviation-related documents, journey logbooks, aircraft mechanics work orders, airframe logbooks, propeller logbooks, and engine logbooks) into digital format. Based on the predefined bounds, character recognition, e.g., OCR/ICR/ICR engine(s), may be used to convert each cell to a digital format. A decision engine determines, based on reinforcement learning data, the correct value of each cell based on a confidence of the character recognition. The decision engine may be a series of logical filtering, sorting, context rules (e.g., REGEX rules for specific columns) and suggestions based on the reinforcement learning model used to normalize the imperfections associated with the character recognition technologies. The final result is a serialized digital format that can be exported to an endpoint (e.g., spreadsheets, database, etc.).

The systems and methods described herein may be used for scanning physical documents, such as aviation data sheets, with a mobile device for the purposes of serializing such data to a digital format. The systems and methods may use novel data analysis techniques and may use various character recognition technologies that include but are not limited to character recognition technologies such as Optical Character Recognition (OCR) technology and Intelligent Character Recognition (ICR). The accuracy of such data digitization may be analyzed using a variety of techniques described herein.

The systems and methods for scanning the documentation into a stored, serialized and digital format can mitigate potential physical corruptions in the data as well as various physical inconveniences. For example, the physical copy may contain a great deal of data that may be difficult to parse and/or manage. Further, only particular data points of the document may be pertinent and the digital storage of the entire document may be disadvantageous. Therefore, digital storage of the entire document may be inefficient and costly due to the size and nature of the physical document.

Many types of data digitization may be improved using the systems and methods described herein. Example data for the data digitization includes running totals in a Pilot's logbook. The totals may be carried over from previous pages. As the totals may be carried over from previous pages, even a single mathematical error (e.g., an error in summing up flight hours) at the beginning of the logbook can skew every page afterwards to have an incorrect cumulative total. Other examples of potential errors may include incorrect time zone calculations, incorrect entry of day/night flight time breakdown, or incorrect spelling of data or making the data legible. The digitization and electronic data techniques described herein mitigate or prevent the risk of such errors.

In one aspect, a process for converting physical text from aviation-related logbooks to a digital format using a mobile device through an application interface such as a mobile application is described.

In some embodiments, a digital image may be obtained by scanning a physical aviation logbook. Some examples of mobile devices include a smartphone camera using a mobile application, or a desktop scanner using a web based application. A character recognition technique may be used, including but not limited to OCR and ICR, to digitize the physical text. End-users may be allowed to assign columns and rows to specific types of data for importing handwritten text into an application. For example, Column A: Date, Column B: Departure Aerodrome, Column C: Arrival Aerodrome. This can allow users to digitize a variety of document types, regardless of column order. Predetermined templates may be selected to match different types of documentation for data extraction. End-users may assign columns and rows to specific types of data for exporting to digital format (e.g.

CSV, Google Sheets, etc.). For example, Column A: Date, Column B: Departure Aerodrome, Column C: Arrival Aerodrome. End users may select the predetermined or user-determined template to match the types of documentation to be exported.

In some embodiments, accuracy and reliability of data may be assessed. Different mathematical formulas may be calculated based on column context. End-users may be notified of errors when compared with the corresponding manually entered row in the physical document. An example is the summation of hours for daytime flight compared to the cumulative column in a physical pilot's logbook. Digitized text may be highlighted that has either been digitized incorrectly, or flagged for incorrect spelling, which may be part of a review process. A notification may be provided by highlighting the flagged word in a discernible pattern such as red font. The recommendations may include but are not limited to spelling suggestions and previous entries. Users may also have the option to override recommended options with custom text. Text may be digitized from one or more entries in a physical aircraft journey log book to an electronic logbook. Using one or more of the following columns: date, departure aerodrome, arrival aerodrome, and UTC (or Zulu) time, it may be determined how much of the flight time was day and how much was night. The exported format will show the correct flight time breakdown in the "day" and "night" rows. These are merely some of the features of the development.

In another aspect, a process for converting physical text from aviation-related documents to a digital format using a mobile device through an application interface such as a mobile application is described.

Various embodiments of the various aspects may be implemented. A digital image may be obtained by scanning a physical document. Some examples of mobile devices include a smartphone camera using a mobile application, or a desktop scanner using a web based application. The physical text may be digitized using a character recognition technique including but not limited to OCR and ICR. The digitized text may be available to be transferred over to third party companies authorized by the end user in relation to the data being extracted. Examples include aircraft fleet management software, maintenance management software, or aircraft record software. Errors may be detected, for example missing signatures, missing stamps, or other incorrect data from physical aviation-related documents.

In another aspect, a computer-implemented method of converting physical text from an aviation logbook to a digital format using a mobile device through an application interface is described. The method may include scanning physical text in a logbook to obtain a digital image and digitizing the physical text from the digital image based at least in part on a character recognition technique. Digitizing the physical text may include assigning a first set of columns and rows to first types of data in order to import text from the digital image, assigning a second set of columns and rows to second types of data in order to export text to a digital format, calculating one or more formulas based on column context, notifying a user of an error based at least in part on comparing the one or more formulas with a column of the first set of columns, flagging a portion of the text of the digital format, and generating an electronic logbook based at least in part on the digitizing the physical text.

Various embodiments of the various aspects may be implemented. The application interface may include a mobile application. The physical text may correspond to different pages of a physical aviation logbook. Scanning the logbook may include scanning the logbook by one or more of a smartphone camera using a mobile application or a scanner using a web based application. The character recognition technique may include one or more of OCR or ICR. Based on assigning columns and rows to types of data, a document may be digitized regardless of column order. The method may further include mapping a template to a particular type of documentation for data extraction. The method may further include selecting the template. The one or more formulas may include a summation of a plurality of hours for daytime flight. Flagging a portion of the text of the digital format may be based at least in part on determining one or more of the following: an issue with the digitizing, a spelling issue, and results of a review process. The method may further include, based at least in part on flagging the portion of the text of the digital text, one or more of the following: highlighting the portion of the text, and providing a recommendation. The second set of columns may include one or more of the following: a date, a departure aerodrome, an arrival aerodrome, or a time. The method may further include, based at least in part on the second set of columns, determining an amount of daytime flight time and an amount of nighttime flight time.

In another aspect, a computer-implemented method of converting physical text from a logbook to a digital format using a mobile device through an application interface is described. The method may include, as implemented by an interactive computing system configured with specific computer-executable instructions, scanning a document, obtaining a digital image based at least in part on scanning the document, digitizing the document using a character recognition technique to generate digitized text, providing the digitized text to a third party, and detecting one or more errors in the digitized text.

Various embodiments of the various aspects may be implemented. The third party may include one or more of the following: aircraft fleet management software, maintenance management software, spreadsheet software or aircraft record software. The one or more errors may include one or more of missing signatures, missing stamps, or other incorrect data. The application interface may include a mobile application. The document may be a handwritten document. The document may be a physical aviation logbook. Scanning the document may include scanning the document by one or more of a smartphone camera using a mobile application or a scanner using a web based application. The character recognition technique may include one or more of optical character recognition or intelligent character recognition. Digitizing the document may be based at least in part on assigning columns and rows to types of data. The method may further include mapping a template to a particular type of documentation for data extraction. The method may further include selecting the template. The one or more errors may be based at least in part on one or more formulas, where the one or more formulas may include a summation of a plurality of hours for daytime flight. The one or more errors may be based at least in part on determining one or more of: an issue with the digitizing, a spelling issue, or results of a review process. The method may further include flagging a portion of the text of the digital text, where the flagging may include one or more of highlighting the portion of the text or providing a recommendation. The digitized text may include one or more of a date, a departure aerodrome, an arrival aerodrome, a time, or any other log information. The method may further include, based at least in part on the digitized text, determining an amount of daytime flight time and an amount of nighttime flight time.

In another aspect, an electronic device for converting physical text from an aviation logbook to a digital format is described. The device comprises an imaging device, a processor, and a memory. The memory has instructions stored thereon that, when executed by the processor, causes a method for converting physical text to the digital format. The method comprises generating a digital image of the physical text using the imaging device and digitizing the physical text in the digital image based at least in part on a character recognition technique. Digitizing the physical text comprises assigning a first set of columns and rows to first types of data in order to import text from the digital image, assigning a second set of columns and rows to second types of data in order to export text to a digital format, calculating one or more formulas based on column context, and checking for an error based at least in part on comparing the one or more formulas with a column of the first set of columns. The method further comprises generating an electronic logbook based at least in part on digitizing the physical text.

Various embodiments of the various aspects may be implemented. In some embodiments, generating a digital image comprises scanning the physical text by a mobile device camera. The processor may be further configured, based on assigning columns and rows to types of data, to digitize first physical text from a first document having columns in a first order and digitize second physical text from a second document having columns in a second order, where the first order is different from the second order. The processor may be further configured to notify a user of an error. The processor may be further configured to flag a portion of the text of the digital format. The processor may be further configured to map the template to a particular type of documentation for data extraction and to select the template. The physical text may be aviation logbook data.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Exemplary Wireframe Schematic of a Mobile Application UI

Figure 1:
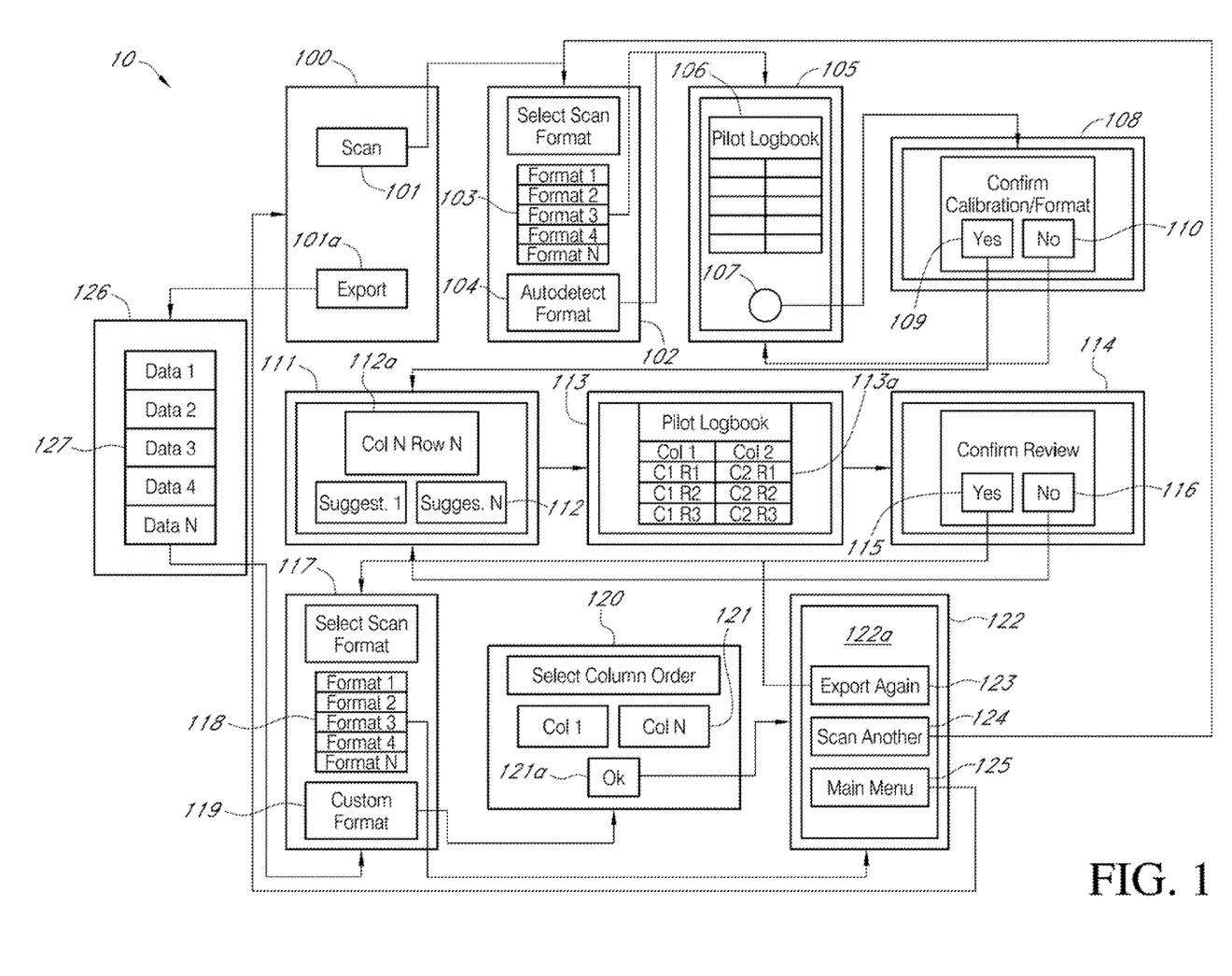
FIG. 1 is a wireframe of an embodiment of an electronic application containing user interface components to apply a process for analyzing digital image data according to the present disclosure.

FIG. 1 is a schematic of an example character recognition system 10 wireframe containing exemplary interface components to achieve various processes described herein. The wireframe schematic of FIG. 1 is a page schematic or screen blueprint and is a visual guide that represents the skeletal framework of a software program. The wireframe depicts various modules or components of the software as shown in a page layout or arrangement, including interface elements and how they work together. It will be understood the processes described with respect to FIG. 1 may be implemented with more, fewer, and/or different components described herein. The system 10 should not be interpreted as a limitation of components required for the various processes.

In some implementations, the character recognition system 10 may be a single client-application. In other implementations, the character recognition system 10 may be one or more of (e.g., both) a client-side application serving as the interface for user-input via a user computing device and a server-side application serving as an interface to the data and a data store. A sample initiation user interface 100 may include a main menu where selections to navigate the process begin. In the example of FIG. 1, a scanner 101 such as an imaging sensor on a mobile device is included, however, it will be understood that more or fewer interactive components may be included. The end-user may interact with scanner 101 to initiate the scanning process of a logbook or aviation-related document.

Based upon an interaction with the scanner 101, the character recognition system 10 may generate a format user interface 102. The format user interface 102 may be a representation of one or more formats from which the end-user can select. A format component 103, such as a menu, may depict the different document types and formats that are available to be serialized. For example, an available format may be a pilot's logbook. In some embodiments, any type or format of aviation-related document may be used. A data store may dynamically populate the format component 103. For example, the data store may be associated with and/or may include one or more of a MySQL database sevice, a Postgres SQLite a database service, or it may be hard-coded into the format user interface 102. An auto-select component 104 may depict an interactive component that, based on an interaction by the end user, may auto-detect a document type selection (e.g., auto-detects a format). Once a format is optionally chosen, an image display component 105 may display the screen where the camera apparatus captures and/or uploads an image. If a format was selected in the format user interface 102, data-bounds 106 of the format may be displayed on the image display component 105 in order to align the image with the captured image.

Once the image is captured and/or uploaded in the image display component 105, an image capture component 107 is used to affirm image capture and/or upload an image which transfers that image data to a machine learning model. For example, the machine learning model may perform one or more of data-bound detection (such as predefined bounds or cells in a table) or optical character recognition. This step may repeat any number of times (e.g., the number of times may be based at least in part on how many pages of data the format calls for).

Based on the output of the machine learning model, the character recognition system 10 may transition to a confirmation component 108 which may perform confirmation and/or calibration to confirm that the image-data matches the alignment of the format intended. For example, where a pilot's logbook is being scanned, if the detected columns are misaligned such as being offset by a single row, the character recognition system 10 may provide the option to the end-user to pick the beginning row instead of the one auto-detected. This calibration/confirmation step performed using the confirmation component 108 may detect if the intended format is incorrect for the type of document being scanned. Secondary business logic rules can also be applied to this step. For example, where a pilot's logbook is being scanned, specific rows related to the pilot's journey can then be selected with the other rows being omitted. After all logic has been applied, the refutation of the format can be selected by using a reformat component 110 to segue back to the image display content 105 and/or the format user interface 102 to re-select the format and/or re-do the scan. Otherwise, to affirm the calibration and format, a confirmation component 109, such as a menu or buttons for "yes" or "no" as shown, can be selected and/or used to continue to a review user interface 111.

If a character recognition technology was not used in the transition of the image display component 105 to the confirmation component 108, the character recognition technology may be implemented after the data-bounds have been confirmed. By implementing the character recognition technology after the transition from the image display component 105 to the confirmation component 108, unneeded data may be pruned out, thus saving processing power and time.

The review user interface 111 may depict a review screen. For example, the review screen may be a review for a pilot logbook composed of rows and columns. Further, the review process may be iterative on a per cell basis and may display image data for the cell in a selection component 112a based on a row identifier (e.g., Row N) and a column identifier (e.g., Col. N). The cell may be subject to different algorithms based on several factors. Factors may include previous choices by the character recognition system 10, the particular character recognition technology, normalized outputs based on the type of data of the cell, cap height character inference, sorting/filtering based on suggestions that are more likely to be chosen as correct. Each of the suggestions (Suggestion N) may be displayed as one or more suggestion components 112, as the screen viewport allows. The end-user may then select the closest suggestion to the actual inferred text in the image data (for example, as displayed on a selection component 112a), or alternatively enter in custom data. In some implementations, this process may repeat until all reviewable cells have been completed. Further details of the review process are described herein, for example with respect to FIG. 2.

Once the review process has been completed, a data summary user interface 113 may display with a summarized view of successfully reviewed data 113a. In some implementations, if the viewport does not allow full view of the reviewed data, the data may be magnified and any overflow on the viewport may be scrollable with standard movement input gestures (e.g., a scrollbar in the case of a web application in a browser, or finger slide gestures in the case of a mobile touchscreen device). In the data summary user interface 113, the user may correct any data in the table still viewed as incorrect as well as any errors with the full column numeric totals that are detected. For example, the table may include multiple columns that are indicative of the number of hours a pilot flies on different types of aircraft and, at the bottom of the columns, a cumulative total cell is added for summation of that particular column. If any discrepancies are detected with the reviewed and confirmed singular numbers mathematically summed up versus the detected number in the cumulative column at the bottom of the row, the discrepancy may be displayed and the user may be notified via a model. In some implementations, the model may not follow up with any action in terms of application flow as the correction may be made on the physical logbook.

The character recognition system 10 may transition to a serialized data review user interface 114 for user confirmation that the serialized data has been reviewed and is deemed correct by the user. For example, the serialized data review user interface 114 may provide one or more options to the end-user (e.g., a refutation option 116 that segues the process back to the review user interface 111 for re-review or a confirmation action 115 that continues the control flow to an export format user interface 117). In some implementations, a confirmation action may act as a digital signature that the reviewed data is ensured as correct based on particular specifications (e.g., logbook specifications).

The export format user interface 117 may provide for the selection of an export format. The selections of the export formats may be located in export component 118. The export component 118 may be populated dynamically from a data store (e.g., MySQL, Postgres SQLite), or hard-coded into the export format user interface 117. Selections in the export component 118 may be based on a detected format of the input image. For example, some export formats may include (but are not limited to): a spreadsheet, or onto spreadsheet software, whether it be server based (on a web application over the internet) or on a local application via different file formats (e.g., CSV, XLSX, etc.), third party services via an API (e.g., a service manages aircraft fleets), a data store (e.g., a local data store, a remote data store, or a data store on a different server such as MySQL, SQLite), or a text file (e.g., a text file in a format such as XML, JSON, YAML).

The serialized image output data may be optionally stored on the local client or on a data store on a separate server via an API. A previous data serialization user interface 126 may be accessed by selecting component 101a in the initiation user interface 100. The previous data serialization user interface 126 may store previous data serializations in a data component 127. Once a selection from the data component 127 is made, the character recognition system 10 may make an export selection.

Custom data component 119 may allow for custom selection of a tabular data format (such as a spreadsheet, CSV, XLSX) with a custom column order format in custom data user interface 120. Order component 121 exemplifies a drag and drop action where ordered output cells may be based on the tabular export data's column order. Once the order has been set, an order confirmation component 121a may be an affirmative button such that an interaction with the order confirmation component 121a causes a transition to a final user interface 122. In some implementations, if a selection from the export component 118 was selected, the custom data user interface 120 is skipped and the character recognition system 10 may transition to the final user interface 122.

A final result of the export data may be displayed in final display component 122a. Any diagnostic messages as well as affirmation that the export was successful may also be displayed. The final user interface 122 may also contain one or more components (e.g., further export (export component 123), another scan (scan component 124), or main menu (menu component 125)) that transition to different user interfaces. The export component 123 may be selected if there was a diagnostic message in final display component 122a indicating the export failed and the end-user would like to try again or allowing for a different selection of export for the same serialized dataset. The export component 123 may transition the character recognition system 10 to the export format user interface 117. The scan component 124 may indicate that the end-user would like to continue with a new scan. For example, multiple pages may need to be scanned. The scan component 124 may allow for a transition to the format user interface 102 to allow for additional scans and thereby saving time. The menu component 125 may include a button that may transition back to the initiation user interface 100, indicating the user has completed the scan and would not wish to scan anymore.

Exemplary User Review Logic Process

Figure 2:
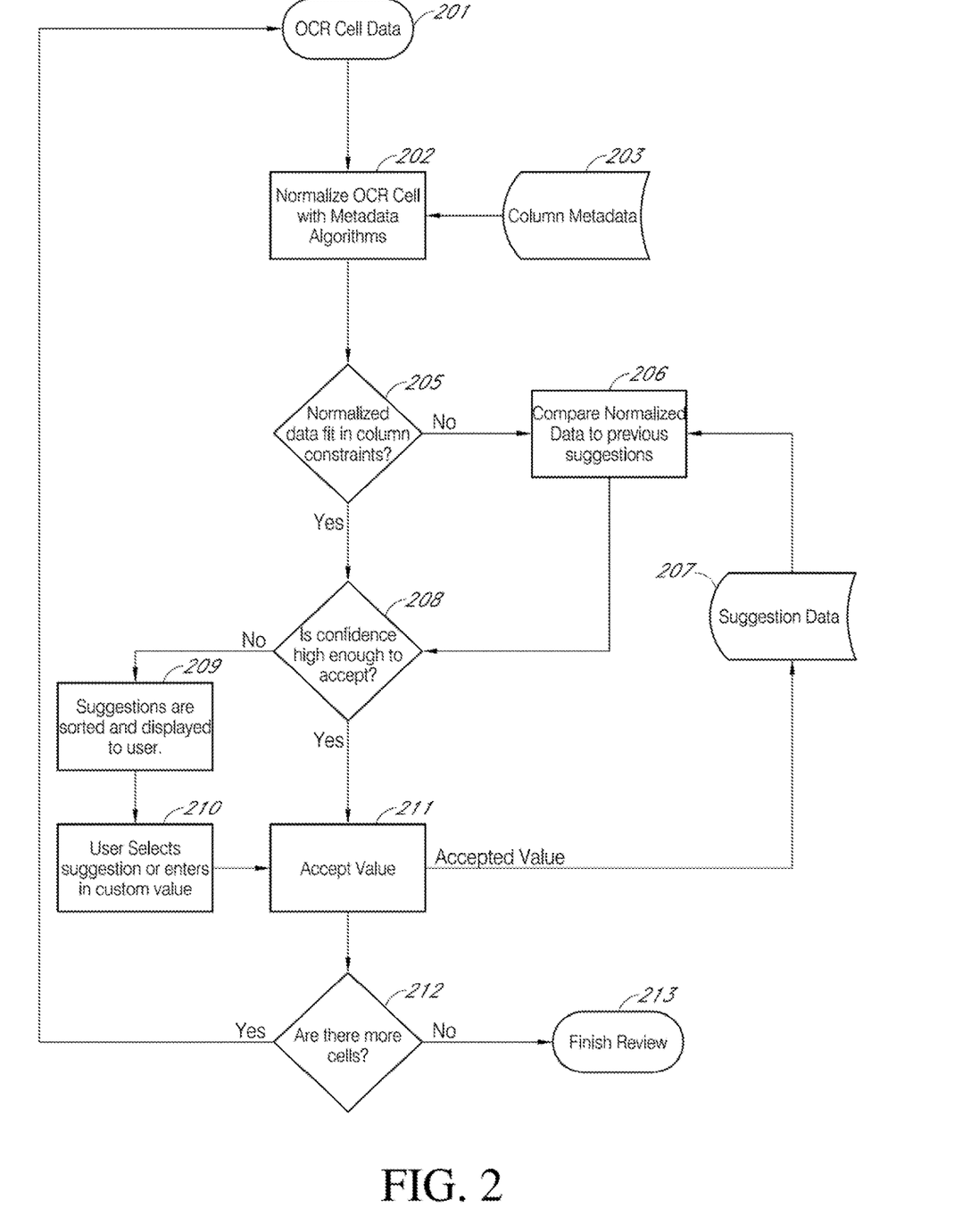
FIG. 2 is a flowchart showing an embodiment of a method that defines the steps of the user review process after a result is received from a character recognition technique, such as OCR/ICR/ICR, or others.

FIG. 2 is a flowchart of an embodiment of a dynamic character recognition and digitization process 200 in accordance with certain aspects of the present disclosure. The process 200 can be implemented by any system that can supplement character recognition technology. The process 200, in whole or in part, can be implemented by, for example, the character recognition system 10, among others. Although a variety of systems, in whole or in part, can implement the process 200, to simplify discussion the process 200 will be described with respect to particular systems.

The process 200 may begin automatically after scanning physical text. For example, the character recognition system 10 may periodically receive a scanned image (e.g., daily, weekly, monthly, etc.). The character recognition system 10 may receive the scanned image in order to generate a digital representation of the scanned image. The physical text may or may not be scanned or imaged by the same device that analyzes the image for digitization. The process 200 may be embodied in a set of executable program instructions stored on a computer-readable medium, such as a memory or one or more disk drives, of the character recognition system 10. The memory may be remote from the device, such as a server or cloud application. When the process 200 is initiated, the executable program instructions can be loaded into memory, such as random access memory ("RAM"), and executed by one or more processors of the character recognition system 10. In some embodiments, scanning physical text may be part of the process 200.

The process 200 may be performed when following the user review implementation as exemplified in FIG. 1. The process 200 may include different algorithms that may be implemented in order to supplement the character recognition technologies (e.g., OCR/ICR result data for quick end-user action). In the process 200, a single cell data entry in a Pilot's logbook may be provided to the character recognition system 10, where the Pilot's logbook is composed of columns and rows. It will be understood that, in other embodiments, the Pilot's logbook may include any number of columns and any number of rows. Further, it will be understood that any type or format of scanned image may be provided to the character recognition system 10.

The process 200 may begin at step 201, where the character recognition system 10 receives the data obtained by the character recognition technologies (e.g., OCR cell data). For example, the character recognition system 10 may obtain OCR cell data that may be based on a particular entry in a particular cell of data obtained by the character recognition system 10 after performance of the character recognition technologies (e.g., OCR/ICR data recognition process). The OCR cell data may be based on a single entry or multiple entries. While at step 201, the character recognition system 10 obtains OCR cell data, it will be understood that, in some embodiments, the character recognition system 10 may receive any type of data.

The process 200 then moves to step 202, where the character recognition system 10 normalizes the obtained data (e.g., OCR cell data). In some embodiments, the character recognition system 10 may obtain the column metadata from a data store. For example, the data store may be a local data store or a remote data store. Further, the data store may be a client side data store in communication with the character recognition system 10 through an interface (e.g., the application cache). Further, the character recognition system 10 may fetch the data from a server-side service though an application programming interface, for example in step 203 described below. The column metadata obtained by the character recognition system 10 may include data about the context of the character recognition technologies that include but are not limited to the data obtained at step 201 (e.g., OCR cell data). For example, the column metadata may indicate that the data may be based on a particular type of data (e.g., a decimal type with a max value of 10 and a minimum value of 0). Based on previously known column metadata and subject to different algorithms, the character recognition system 10 may normalize the obtained data to match the context described in the metadata and determined from the column metadata. In the example, the data is based on a decimal typed column and the normalizations may include one or more of homoglyph translations to numeric types (e.g., converting an alpha L character to a 1) and maximum/minimum value evaluations (because the upper bound constraint of the value is for example set to 10, the character recognition technologies that include but are not limited to OCR/ICR value 70 may be implied as 10 after homoglyph normalization).

At step 203, the character recognition system 10 obtains and/or determines the column metadata. Such metadata may be input to and/or retrieved by the system 10. Step 203 may be performed during or after step 202, for example as described above with respect to step 202.

The process then moves to step 205, the character recognition system 10 determines if the normalized data fits in the column constraints (e.g., tests the normalized data based at least in part on metadata constraints). For example, based on the cell of a column with data that has been typed as numeric containing (after normalization) the alpha character K (e.g., the normalized data does not fit in the column constraints), the process 200 may then move to step 206. Otherwise, if the normalized data fits in the column constraints, the process 200 may move to step 208.

At step 206, based on the normalized data not fitting the column constraints, the character recognition system 10 compares the normalized data to suggestion data.

In some embodiments, step 207 may be performed prior to or during step 206. In step 207, based on not inferring the data, the character recognition system 10 obtains suggestion data (e.g., previously accepted results for the related column) from a data store as suggested data. The data store may include data stored locally client side through interfaces such as the application cache, or obtained from a server-side service though an application programming interface. In some embodiments, the suggestion data (e.g., obtained from the data store at step 207) may be accepted by the character recognition system 10 at a prior time and no further normalization may be needed on the obtained suggestions.

At step 208, based on the normalized data fitting the column constraints, the character recognition system 10 determines if the confidence is high enough to accept. The determination of the character recognition system 10 may be based at least in part on the normalized data and/or the suggestion data. The character recognition system 10 may determine confidence data for all or a portion of the data evaluated in the method. In some embodiments, the confidence data may include a magnitude of correctness that the current data cell has in relation to what the end-user may have been implying in the physical cell. Further, the confidence level may be a computed estimate level that specifies a numeric degree to which a result will be deemed correct and/or will vary.

If in step 208 it is determined that the confidence level meets the required threshold for any of the passed input values, the process 200 moves to step 211 where the particular value is accepted. In some embodiments, based on accepting the particular value, the character recognition system 10 may store the accepted value back in a data store. For example, the character recognition system 10 may store the accepted value in the data store from which the character recognition system 10 obtained the suggestion data.

If in step 208 it is determined that a particular value does not meet the confidence threshold, the process then moves to step 209 where the character recognition system 10 causes the user-interface to display to the user all of or a portion of the suggestion data and/or the normalized data. Further, the suggestion data and/or the normalized data may be sorted before or after display.

The process 200 then moves to step 210, where the character recognition system 10 obtains a selection from the user. The selection may include a selection of one or more of the suggestion data, the normalized data, and/or a custom selection.

At step 211, the character recognition system 10 stores the selected value. At step 212, the character recognition system 10 determines if there are more cells to be revised. If there are more cells to be revised by the character recognition system 10, the flow may repeat at step 201. It will be understood that the flow may repeat any number of times and/or iteration.

At step 213, if there are not more cells to be revised by the character recognition system 10, the process 200 may end and the review may be finished.

Exemplary Pilot Logbook Scanned Input

Figure 3A:
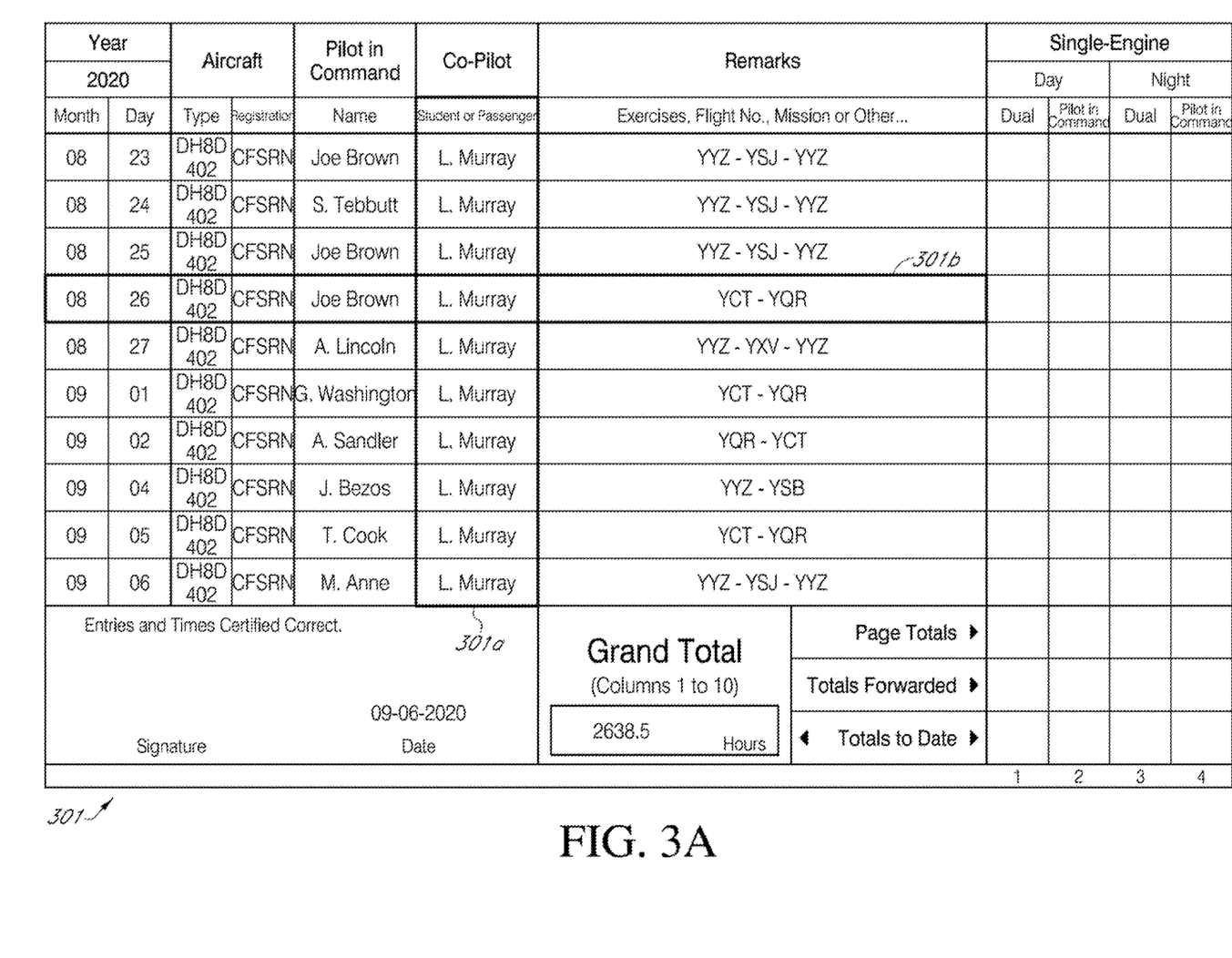
FIGS. 3A and 3B are images of various embodiments of a pilot's logbook pages that may be converted, e.g. serialized, to a digital format using the systems and methods described in FIGS. 1 and 2.
Figure 4:
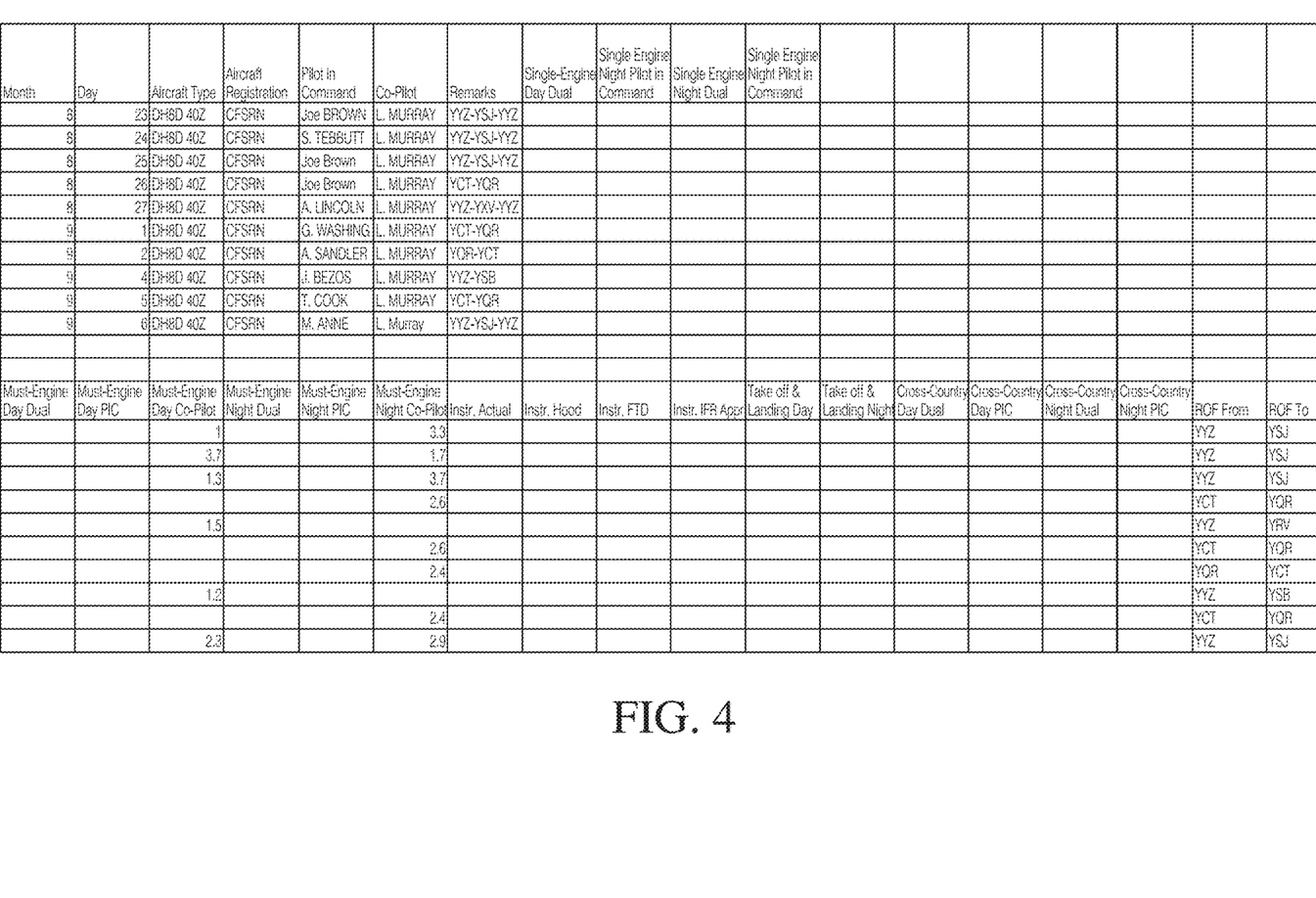
FIG. 4 is an embodiment of a spreadsheet output that may be generated based on the input data provided by the logbook pages of FIGS. 3A and 3B.

FIG. 3A is an exemplary pilot logbook that may be scanned for purposes of digitization. The exemplary pilot logbook may include a first page or image 301. This example consists of columns 301a and rows 301b that may be used to generate serialized output cells respectively as shown in FIG. 4. The columns 301a and rows 301b may be in a first order.

Figure 3B:
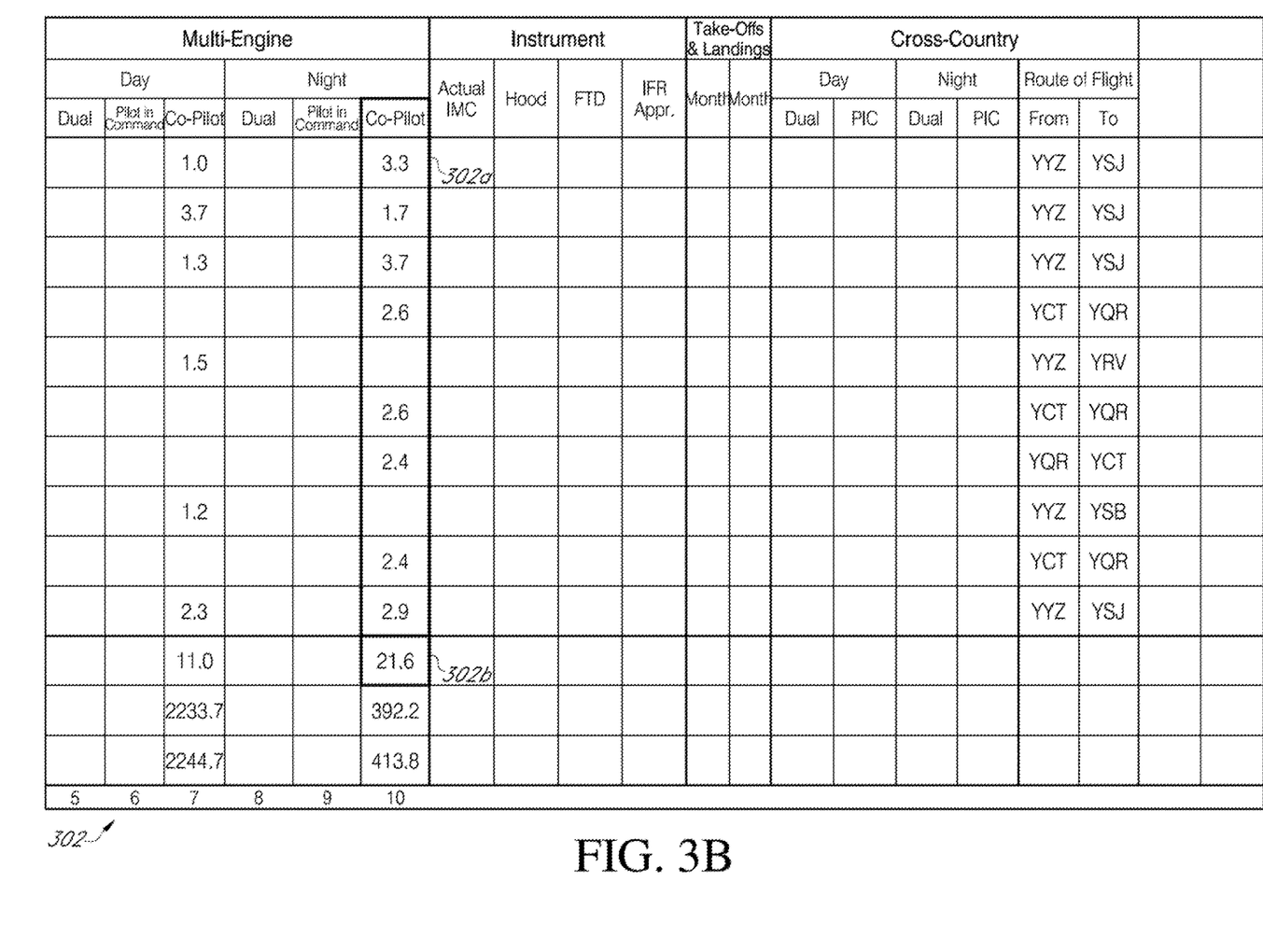

FIG. 3B is an exemplary pilot logbook that may be scanned for purposes of digitization. The exemplary pilot logbook may include a second page or image 302. In some embodiments, the second image 302 may be from the same logbook as the first image 301 (e.g., the first image 301 and the second image 302 may be different pages from the same logbook). I In the second image 302, column 302a describes a column with the name of "Multi-Engine Night Co-Pilot" which may include column metadata with a decimal type, for example as described in step 202 of the process 200 shown in FIG. 2. Cell 302b may include a cumulative summation of the column. Such data could provide the input, for example, for the data summary user interface 113 as described herein for the system 100 of FIG. 1. This type of cumulative summation may be subject to correction in cases of mathematical error, as described herein, for example in the process 200 and using the system 100. The columns 302a and rows 302b may be in a second order that is different from the first order of the columns 301a and rows 301b.

Exemplary Pilot Logbook Spreadsheet Output

FIG. 4 is an exemplary spreadsheet output of the data input shown in FIGS. 3A and 3B. The data may be analyzed, reviewed, formatted, etc. as described herein, for example in the process 200 and using the system 100. Example components that may be used include the custom data component 119, the custom data user interface 120, the order component 121, the order confirmation component 121a, and/or the final user interface 122. The column headers of FIG. 4 may be determined by the column metadata fetched from the datastore for each corresponding column. Empty cells rows and columns scanned in FIGS. 3A and 3B may display as empty cells in the corresponding column output matching the row order of the input.

Exemplary Data Bounds Recognition Logic Process

Figure 5:
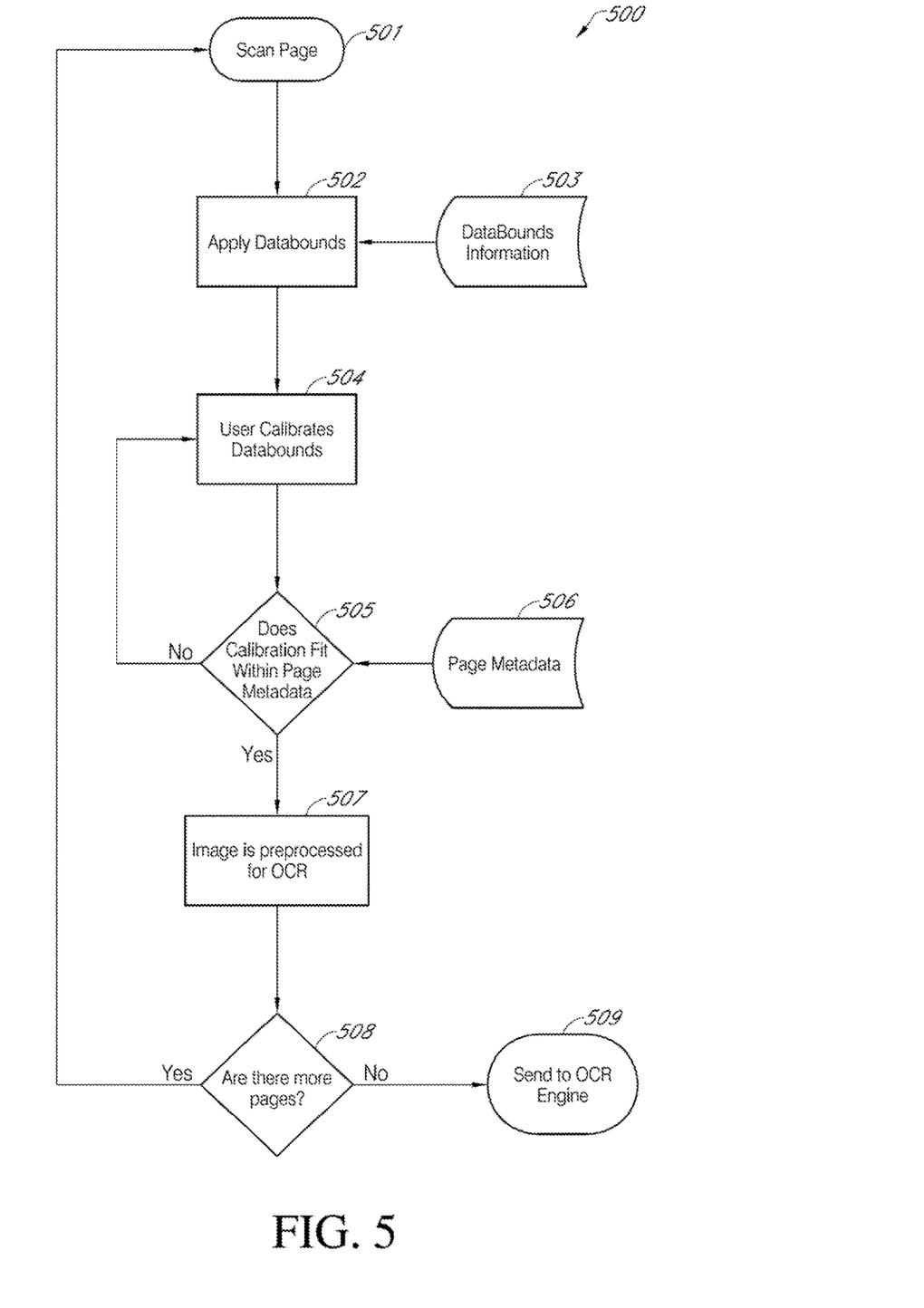
FIG. 5 is a flowchart showing an embodiment of a method for analyzing an image in a machine learning MO model to parse out the data bounds, and then supply the character recognition technologies, that include but are not limited to OCR/ICR/ICR algorithm, with the detected data to be reviewed.

FIG. 5 is a flowchart of an embodiment of a process 500 for processing and determining image boundaries for OCR processing as well as user calibration. The process 500 may be referred to as "databounds" in accordance with certain aspects of the present disclosure. The process 500 can be implemented by any system that can supplement character recognition technology. The process 500, in whole or in part, can be implemented by, for example, the character recognition system 10, among others. Although a variety of systems, in whole or in part, can implement the process 500, to simplify discussion the process 500 will is described with respect to particular embodiments.

The process 500 may begin at step 501, where a system (e.g., the character recognition system 10) receives the image data obtained by the mobile device, for instance by scanning. For example, the character recognition system 10 may obtain image data such as the digital image embodiment of FIGS. 3A and 3B, such as a Pilot's logbook, through the use of the optical camera on the mobile device. It will be understood that, in other embodiments, the image data may be any other kind of scanned aviation document to be provided to the character recognition system 10.

The process then moves to step 502, where the system applies the databounds. The boundaries of the image scanned may be determined and processed. In some embodiments, step 503 may be performed prior to or concurrently with step 502. In step 503, the metadata pertaining to what image boundaries are necessary based on the actual type of scanned image may be obtained. This databounds information may include how many different data points are located on a given page, as well as where the data points are relative to one another. The origin of the relation between data points may be determined based on a known object on the scanned image such as the physical corner of a page or the beginning of tabular data such as the example used in FIGS. 3A and 3B of a Pilot's Logbook. This data may then be applied in step 502, as described.

The process then moves to step 504, where, when the data boundaries are known, the user, via a user computing device, calibrates the databounds to correct any data boundaries which may be misaligned or missing, based on the data boundaries that are applied at step 503. For example, the user, via the user computing device, may determine the start and end data cells that pertain to tabular data such as that of a Pilot's Logbook. In order to correctly identify where to begin reading the cellular data, the user, via the user computing device, may need to determine the beginning and end cells for data correction and formatting purposes, such as the one described in step 503.

The process then moves to step 505. As described above, with the example of the Pilot's logbook, in step 505, when the start and end cells are determined, the system utilizes the user assisted data to determine if the scanned image correctly matches the format as obtained in step 503. For example, if it is known that the beginning column in image 301 is the "Date" column, and the end column of the page is the "Pilot-in-command" sub column of the column "Single-Engine," the process 500 can determine whether the image was correct based on the user-chosen values, as well as calculating the number of rows available in the actual image after the start column has been chosen. The page metadata and/or other data may be obtained and provided, for example from a datastore, in step 506. Step 506 may be performed prior to or concurrently with step 505. If it is known that the beginning column should only have 10 rows of data such as in example 301, and more data rows are found, it can be concluded that the decision tree in step 505 is not met with a truth value and will fallback to recalibration step 504. Otherwise, the process may continue to step 507 for OCR preprocessing.

The process then moves to step 507, where the image data deemed correct by calibration measure in previous steps is preprocessed by the system for the OCR model. In some embodiments, preprocessing may include but are not limited to gray scaling the image for better text contrast, cropping out different parts of the image to ease OCR requirements by reducing the text being read to only the necessary text, and/or adjusting the angle of the image to be more rectangular for easier OCR processing. In the example with the Pilot's Logbook in image 301, each cell of data in the table can be cropped and superimposed on a new image that has all of the data lined up sequentially instead of in a tabular format. This may ease and improve OCR results by reducing the potential of two columns being read as a single value while maintaining the speed of sending a single image to the OCR engine versus sending singular cell values in multiple images for the same effect.

After the image is preprocessed, the process then moves to step 508, where it is determined if there are more pages that need to be processed per single scan format. If the answer is "yes," the process 200 may proceed back to step 501 to repeat the flow for the next page. For example, in FIGS. 3A and 3B, the first image 301 and the second image 302 may depict two corresponding pages to be scanned together in order to satisfy a single iteration of process 500. The process 500 may be performed to analyze the image 301 and then after step 508 return to step 501 to analyze the image 302. Otherwise, if there are no more pages to be scanned, the process 500 after step 508 may proceed to and end at step 509 and be ready for OCR evaluation.

Exemplary Data Correction Notification and Export Logic Process

Figure 6:
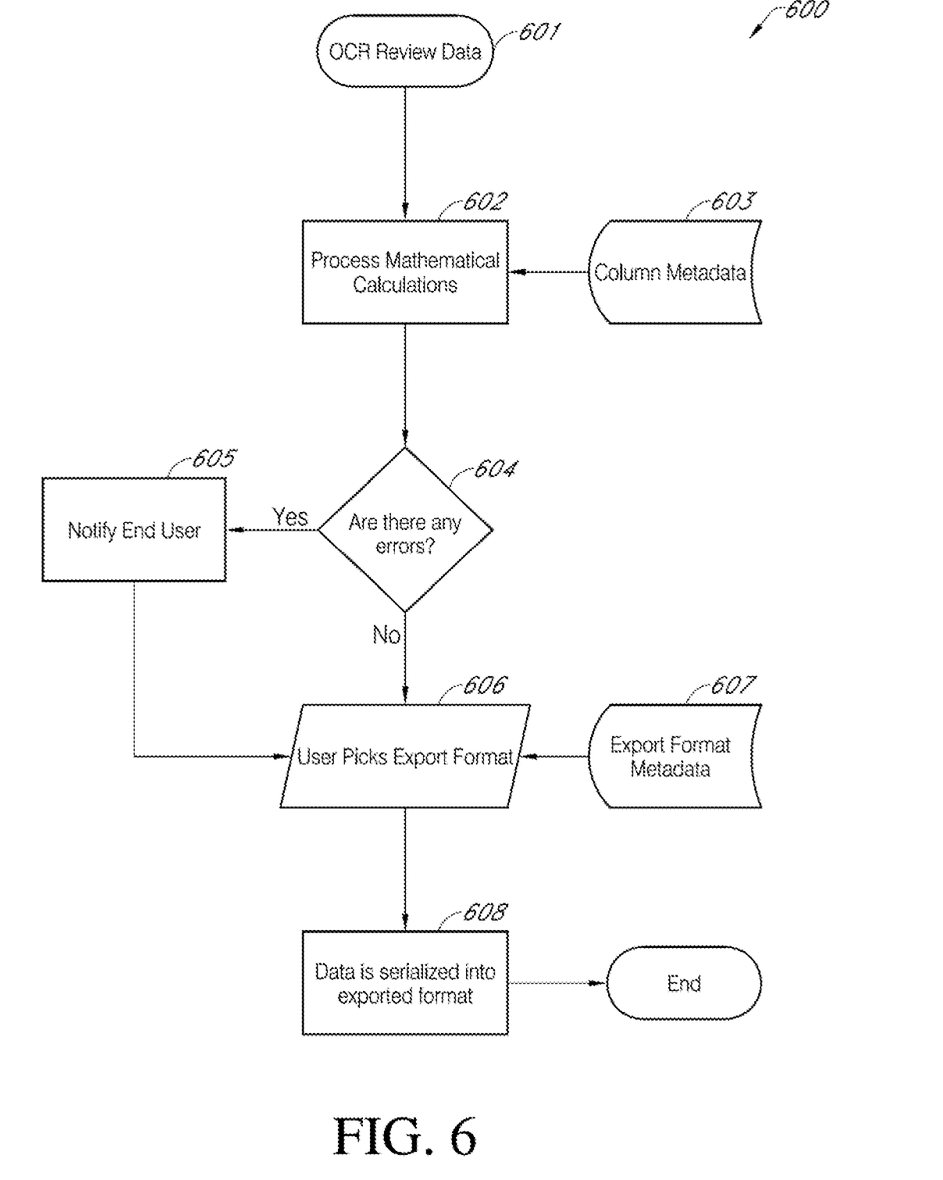
FIG. 6 is a flowchart showing an embodiment of a method for exporting the post-reviewed and confirmed serialized data into a predetermined export format.

FIG. 6 is a flowchart of an embodiment of a process 600 for a data correction and notification logic flow in accordance with certain aspects of the present disclosure. The process 600 can be implemented by any system that can supplement character recognition technology. The process 600, in whole or in part, can be implemented by, for example, the character recognition system 10, among others. Although a variety of systems, in whole or in part, can implement the process 600, to simplify discussion the process 600 will be described with respect to particular systems.

The process 600 starts at step 601, where the successfully reviewed and accepted OCR data is accepted by the system. This data may have been analyzed in the process 500. This data may be corrected and finalized and may need no further intervention from the end-user.

The process then moves to step 602 where the system recalculates specific mathematical equations based on column metadata. The metadata may be provided in or fetched by the system from a database in step 603, which may be performed prior to or concurrent with step 602. For example, in the case of a Pilot's Logbook, if a column of data may be summed up such as in image 302's "Co-Pilot" column 302a into the value located in 302b, since the OCR Review data may contain the digital representation of the column, the summation could be calculated and compared to the value in column 302a. If the summed value of the corresponding column does not equal the value in column 302a, an error is stored in memory and the process 600 moves to step 604.

The process then moves to step 604, where the system checks errors as processed in step 602. If there are any errors stored, the process moves to step 605 where the system notifies the user, via the user computing device, for instance through a mobile notification, and then proceeds to step 606. Otherwise if there are no errors in step 604, the process 600 then proceeds to step 606.

In some embodiments of step 606, the user, via the user computing device, may pick the intended export format. Some formats may include third party applications such as aircraft fleet management software, maintenance management software, aircraft record software or spreadsheet software. The valid formats for specific scans may be determined by the system from a datastore in step 607, which may be performed prior to or concurrent with step 606. For example, for a Pilot's Logbooks, the different export formats may include aircraft fleet management software, aircraft record software or spreadsheet software, but may not include maintenance management software. Once the user picks the intended export format, the process 600 transitions to step 608.

In step 608, the system serializes the reviewed data into the chosen export format. Depending on the format, different steps may be required to complete this step. For example, if the data was a Pilot's Logbook and the export format was for a Spreadsheet, each single cell may be iterated through and written sequentially into a comma separated value file or CSV, such as shown in, and described with respect to, FIG. 4. In another example, if the digitized Pilot's Logbook data may be exported into a third party aircraft fleet management software, the data may be serialized into a format that may be able to be read by that corresponding API, such as serializing the data to JSON. After step 608 is complete, the process 600 ends.

Example Electronic Device for Scanning and/or Digitizing Physical Data

Figure 7:
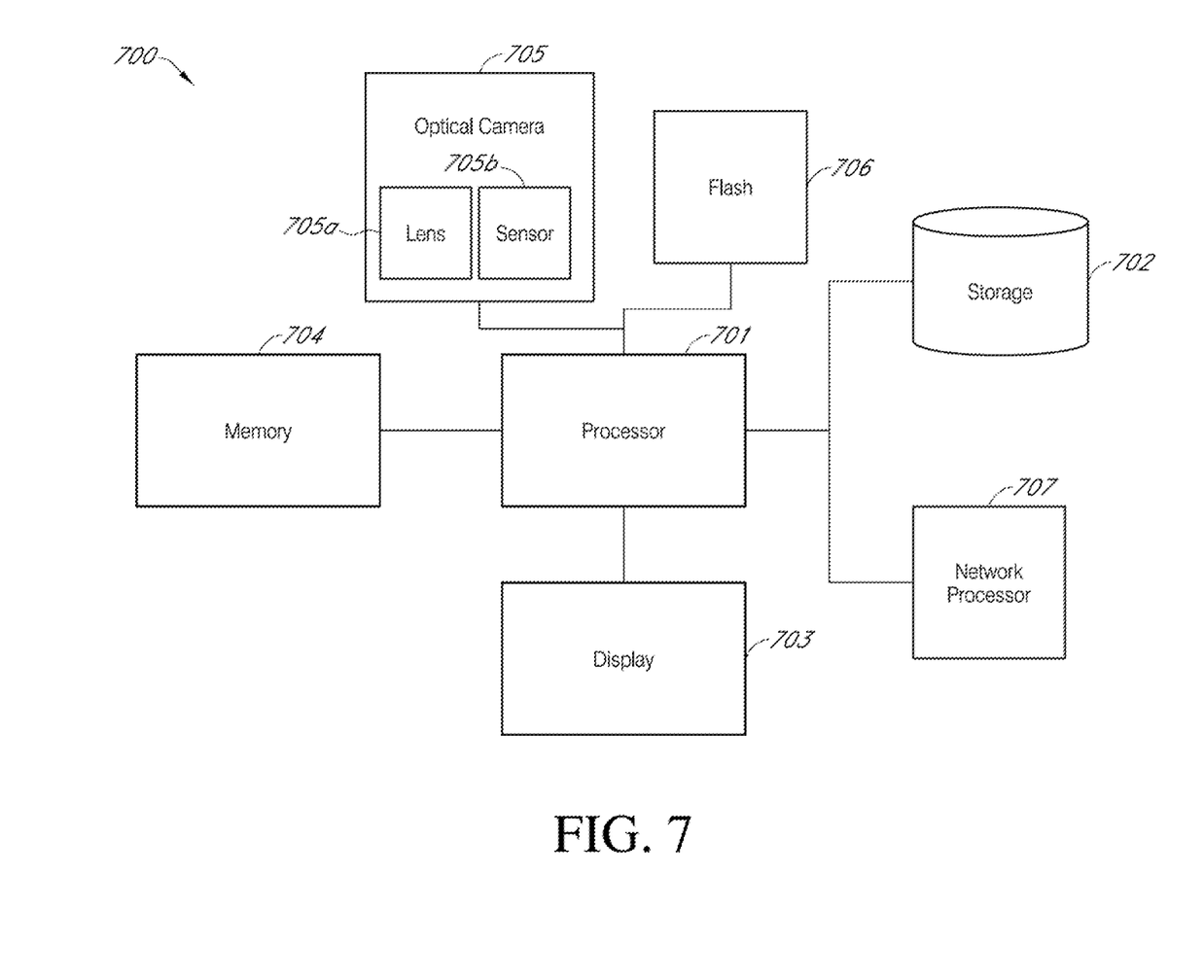
FIG. 7 is a block diagram illustrating an embodiment of an electronic device that may be used to perform the various methods described herein, such as those shown in, or described with respect to, FIGS. 1-6.

FIG. 7 depicts a block diagram schematic of an electronic device shown as a mobile device 700 that may be used to scan documents in accordance with the subject matter in this disclosure. The device 700 may include a processor 701 connected to an optical camera 705, optionally a flash system 706 to assist the camera 705 in low light conditions, a memory unit 704 such as RAM, a storage device 702, a display 703, and optionally a network processor 707. The optical camera 705 may include a lens unit 705*a* and a CMOS sensor 705*b*.

Light enters the optical camera 705 through the lens unit 705*a* which creates a convex refraction of light where the focal point is processed through the CMOS sensor 705*b* to create a digital image that is sent to processor 701. The CMOS sensor may also communicate with processing unit 701 which will adjust the focal length of the light passed through the lens by adjusting the lens to optimize the clarity of the digitized image being sent to the processor. In some embodiments the processing unit 701 is used to further adjust image properties of the digital image such as grayscaling to supplement the OCR process.

The memory unit 704 may be considered a computer readable medium such as RAM and may store instructions for instructing the processing unit 701 to perform various methods and algorithms in accordance with this subject matter. For example, in some aspects, memory unit 704 may be configured to store instructions that cause the processor 704 to perform methods described in FIGS. 2, 5 and/or 6. The memory unit 704 may be local or remote to the electronic device, such as with a server or cloud application.

The storage unit 702 in some embodiments may be used to store data such as the image captured through the optical camera unit 705, as well as different scan formats and export formats as described in FIGS. 1, 2, 4, 5 and/or 6. In some instances, the storage unit may be external storage located remotely across a network, server or cloud, e.g. accessed using network processor unit 707. Some remote storage units some embodiments may communicate with may include databases stored on remote servers.

The display 703 may display images captured via the optical camera 705, the wireframe unit as described in FIG. 1. Some embodiments may also use the display unit as an input device used to control different configurations and functions such as transitioning frames as described in FIG. 1 and as a user input device.

Terminology and Variations

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, steps, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method of converting physical text from an aviation logbook to a digital format using a mobile device through an application interface, the method comprising:
    scanning physical text in a logbook to obtain a digital image; and
    digitizing the physical text from the digital image based at least in part on a character recognition technique, wherein digitizing the physical text comprises:
        assigning a first set of columns and rows to first types of data in order to import text from the digital image,
        assigning a second set of columns and rows to second types of data in order to export text to a digital format,
        calculating one or more formulas based on column context,
        notifying a user of an error based at least in part on comparing the one or more formulas with a column of the first set of columns,
        flagging a portion of the text of the digital format, and
        generating an electronic logbook based at least in part on digitizing the physical text.

2. The computer-implemented method of claim 1, wherein the application interface comprises a mobile application.

3. The computer-implemented method of claim 1, wherein the physical text corresponds to different pages of a physical aviation logbook.

4. The computer-implemented method of claim 1, wherein scanning the logbook comprises scanning the logbook by one or more of a smartphone camera using a mobile application or a scanner using a web based application.

5. The computer-implemented method of claim 1, wherein the character recognition technique comprises one or more of optical character recognition (OCR) or intelligent character recognition (ICR).

6. The computer-implemented method of claim 1, wherein based on assigning columns and rows to types of data, a document is digitized regardless of column order.

7. The computer-implemented method of claim 1, the method further comprising mapping a template to a particular type of documentation for data extraction.

8. The computer-implemented method of claim 7, the method further comprising selecting the template.

9. The computer-implemented method of claim 1, wherein the one or more formulas comprise a summation of a plurality of hours for daytime flight.

10. The computer-implemented method of claim 1, wherein the flagging of a portion of the text of the digital format is based at least in part on determining one or more of the following: an issue with the digitizing, a spelling issue, and results of a review process.

11. The computer-implemented method of claim 10, the method further comprising, based at least in part on flagging the portion of the text of the digital text, one or more of the following: highlighting the portion of the text, and providing a recommendation.

12. The computer-implemented method of claim 10, wherein the second set of columns include one or more of the following: a date, a departure aerodrome, an arrival aerodrome, or a time.

13. The computer-implemented method of claim 10, the method further comprising, based at least in part on the second set of columns, determining an amount of daytime flight time and an amount of nighttime flight time.

14. An electronic device for converting physical text from an aviation logbook to a digital format, the device comprising:
    an imaging device;
    a processor; and
    a memory having instructions stored thereon that, when executed by the processor, cause a method for converting physical text to a digital format, the method comprising:
    generating a digital image of the physical text using the imaging device; and
    digitizing the physical text in the digital image based at least in part on a character recognition technique, wherein digitizing the physical text comprises:
        assigning a first set of columns and rows to first types of data in order to import text from the digital image,
        assigning a second set of columns and rows to second types of data in order to export text to a digital format,
        calculating one or more formulas based on column context, and
        checking for an error based at least in part on comparing the one or more formulas with a column of the first set of columns, and
    generating an electronic logbook based at least in part on digitizing the physical text.

15. The electronic device of claim 14, wherein generating a digital image comprises scanning the physical text by a mobile device camera.

16. The electronic device of claim 14, wherein the processor is further configured, based on assigning columns and rows to types of data, to:
   digitize first physical text from a first document having columns in a first order; and
   digitize second physical text from a second document having columns in a second order, wherein the first order is different from the second order.

17. The electronic device of claim 14, wherein the processor is further configured to notify a user of an error.

18. The electronic device of claim 14, wherein the processor is further configured to flag a portion of the text of the digital format.

19. The electronic device of claim 14, wherein the processor is further configured to map the template to a particular type of documentation for data extraction and to select the template.

20. The electronic device of claim 14, wherein the physical text is aviation logbook data.

\* \* \* \* \*